United States Patent
Song et al.

[11] Patent Number: 6,150,016
[45] Date of Patent: Nov. 21, 2000

[54] HIGH COERCIVITY MAGNETIC RECORDING MEDIUM COMPRISING A THIN COCRTA INTERMEDIATE LAYER

[75] Inventors: Xing Song, Mountain View; Qixu Chen, Milpitas; Charles Leu, Fremont; Rajiv Y. Ranjan, San Jose, all of Calif.

[73] Assignee: Seagate Technolgy, Inc., Scotts Valley, Calif.

[21] Appl. No.: 09/188,681

[22] Filed: Nov. 10, 1998

Related U.S. Application Data

[60] Provisional application No. 60/068,142, Dec. 12, 1997.

[51] Int. Cl.$^7$ ........................................................ G11B 5/66
[52] U.S. Cl. .................. 428/332; 428/336; 428/694 TS; 428/694 TM; 428/694 ST; 428/900; 427/128; 427/129; 427/130; 204/192.2
[58] Field of Search ....................... 428/694 TS, 694 TM, 428/694 ST, 900, 3.32, 336; 427/128–130; 204/192.2

[56] References Cited

U.S. PATENT DOCUMENTS

| | | | |
|---|---|---|---|
| 5,580,667 | 12/1996 | Lal | 428/610 |
| 5,922,442 | 7/1999 | Lal | 428/216 |
| 5,922,456 | 7/1999 | Tanahashi | 428/332 |
| 5,952,097 | 9/1999 | Zhang | 428/332 |
| 5,968,679 | 10/1999 | Kobayashi | 428/694 TS |
| 6,022,609 | 2/2000 | Gao | 428/141 |

OTHER PUBLICATIONS

D. E. Laughlin et al, "The Control and Characterization," IEEE Transaction on Magnetics, vol. 32, No. 5, Sep., 1996, pp. 3632–3637.

"NiAl Underlayers for CoCrTa Magnetic Thin Films", L. Lee, et al., IEEE Transactions on Magnetics, vol. 30, No. 6, Nov. 1994, pp. 3951–3953.

"Effects of Cr Intermediate Layers on CoCrPt Thin Film Media on NiAl Underlayers", L. Lee, et al., IEEE Transactions on Magnetics, vol. 312, No. 6, Nov. 1995, pp. 2728–2730.

"Seed Layer Induced (002) Crystallographic Texture in NiAl Underlayers", L. Lee, et al., J. Appl. Phys., 79(8), Apr. 15, 1996, pp. 4902–4904.

"The Control and Characterization of the Crystallographic Texture of Longitudinal Thin Film Recording Media", D. Laughlin, et al., IEEE Transactions on Magnetics, vol. 32, No. 5, Sep. 1996, pp. 3632–3637.

"The Role of NiAl Underlayers in Longitudinal Recording Media" (abstract), C. Ross, et al., Journal of Applied Physics, vol. 81, No. 8, Apr. 15, 1997, p. 4369.

*Primary Examiner*—Leszek Kiliman
*Attorney, Agent, or Firm*—McDermott, Will & Emery

[57] ABSTRACT

A high areal density magnetic recording medium exhibiting high remanent coercivity and high coercivity squareness is formed with a thin CoCrTa intermediate layer to provide appropriate crystalline orientation and surface morphology for nucleation and growth of a magnetic layer thereon. The present invention also enables the use of lower substrate heating temperatures during deposition. Embodiments include depositing an intermediate Co alloy layer comprising about 10 up to about 15 atomic % Cr and about 1 to about 6 atomic % Ta at a thickness of about 1.5 to about 150 Å.

23 Claims, 5 Drawing Sheets

HIGH COERCIVITY MAGNETIC RECORDING MEDIUM COMPRISING A THIN COCRTA INTERMEDIATE LAYER

RELATED APPLICATIONS

This application claims priority from Provisional Patent Application Ser. No. 60/068,142 filed Dec. 12, 1997, entitled "HIGH COERCIVITY CoCrPtTa MEDIA WITH A THIN INTERMEDIATE CoCrTa LAYER", the entire disclosure of which is hereby incorporated herein by reference.

This application contains subject matter related to subject matter disclosed in copending application Ser. No. 09/188,715 filed on Nov. 10, 1998, now pending and related to U.S. copending application Ser. No. 09/188,682 filed on Nov. 10, 1998 now pending the entire disclosures of which are incorporated herein by reference.

TECHNICAL FIELD

The present invention relates to magnetic recording media, such as thin film magnetic recording disks, and to a method of manufacturing the media. The invention has particular applicability to high areal density magnetic recording media exhibiting low noise, high remanent coercivity and high coercivity squareness.

BACKGROUND ART

The requirements for increasingly high areal recording density impose increasingly greater demands on thin film magnetic recording media in terms of remanent coercivity (Hr), magnetic remanance (Mr), coercivity squareness (S*), medium noise, i.e., signal-to-noise ratio (SNR), and narrow track recording performance. It is extremely difficult to produce a magnetic recording medium satisfying such demanding requirements.

The linear recording density can be increased by increasing the Hr of the magnetic recording medium. However, this objective can only be accomplished by decreasing the medium noise, as by maintaining very fine magnetically non-coupled grains. Medium noise is a dominant factor restricting increased recording density of high density magnetic hard disk drives. Medium noise in thin films is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1 and comprises a substrate 10, typically an (Al)-alloy, such as an Al-magnesium (AlMg) alloy, plated with a layer of amorphous nickel-phosphorus (NiP). Alternative substrates include glass, ceramic and glass-ceramic materials, as well as graphite. There are typically sequentially sputter deposited on each side of substrate 10, underlayer 11, 11', such as Cr or a Cr alloy, a magnetic layer 12, 12', such as a cobalt (Co)-based alloy, and a protective overcoat 13, 13', such as a carbon-containing overcoat. Typically, although not shown for illustrative convenience, a lubricant topcoat is applied on the protective overcoat 13, 13'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is also recognized that underlayers having a fine grain structure are highly desirable, particular for growing fine grains of hexagonal close packed (HCP) Co alloys deposited thereon.

It has been reported that nickel-aluminum (NiAl) films exhibit a grain size which is smaller than similarly deposited Cr films, which are the underlayer of choice in conventional magnetic recording media. Li-Lien Lee et al., "NiAl Underlayers For CoCrTa Magnetic Thin Films", IEEE Transactions on Magnetics, Vol. 30, No. 6, pp. 3951–3953, 1994. Accordingly, NiAl thin films are potential candidates as underlayers for magnetic recording media for high density longitudinal magnetic recording. However, it was found that the coercivity of a magnetic recording medium comprising an NiAl underlayer is too low for high density recording, e.g. about 2,000 Oersteds (Oe).

Lee et al. subsequently reported that the coercivity of a magnetic recording medium comprising a NiAl underlayer can be significantly enhanced by depositing a plurality of underlayers containing alternative NiAl and Cr layers rather than a single NiAl underlayer. Li-Lien Lee et al., "Effects of Cr Intermediate Layers on CoCrPt Thin Film Media on NiAl Underlayers," Vol. 31, No. 6, November 1995, pp. 2728–2730.

Li-Lien Lee et al. were able to obtain an underlayer exhibiting a (200)-dominant crystallographic orientation by initially depositing a Cr sub-underlayer directly on the non-magnetic substrate at a high temperature of about 260° C. using radio frequency (RF) sputtering. However, it is very difficult to obtain a Cr (200)-dominant crystallographic orientation, even at elevated temperature such as 260° C., on glass, ceramic and glass ceramic substrates using direct current (DC) magnetron sputtering, which is widely employed in the magnetic recording media industry.

Li-Lien Lee et al. subsequently reported that an underlayer structure exhibiting a (200)-dominant crystallographic orientation was obtained by depositing a magnesium oxide (MgO) seedlayer using radio frequency (RF) sputtering. Li-Lien Lee et al., "Seed layer induced (002) crystallographic texture in NiAl underlayers," J. Appl. Phys. 79 (8), Apr. 15, 1996, pp. 4902–4904; and David E. Laughlin et al., "The Control and Characterization of the Crystallographic Texture of the Longitudinal Thin Film Recording Media," IEEE Transactions on Magnetics, Vol. 32, No. 5, September 1996, pp. 3632–3637. Such a magnetic recording medium, however is not commercially viable from an economic standpoint, because sputtering systems in place throughout the industry making magnetic recording media are based upon direct current (DC) sputtering. Accordingly, RF sputtering an MgO seedlayer is not economically viable. The use of an NiAl underlayer is also disclosed by C. A. Ross et al., "The Role Of An NiAl Underlayers In Longitudinal Thin Film Media" and J. Appl. Phys. 81(a), P.4369, 1996.

Conventional practices in manufacturing magnetic recording media comprise DC magnetron sputtering and high temperatures in order to obtain Cr segregation in Co-alloy grain boundaries to achieve high Hr and high SNR. Conventional practices, therefore, employ a high substrate heating temperature, e.g. above about 200° C., e.g. about 230° C. to about 260° C., in order to achieve a desirably high Hr. However, such high substrate heating temperatures result in a reduced S* and, hence, increased medium noise.

Accordingly, there exists a need for high density magnetic recording media exhibiting high Hr and high S*. There also exists a need for efficient methodology for producing magnetic recording media exhibiting high Hr and high S*.

DISCLOSURE OF THE INVENTION

An object of the present invention is a magnetic recording medium for high areal recording density exhibiting high Hr and high S*.

Another object of the present invention is a method of manufacturing a magnetic recording medium for high areal recording density exhibiting high Hr and high S*.

Additional objects, advantages and other features of the present invention will be set forth in part in the description which follows and in part will become apparent to those having ordinary skill in the art upon examination of the following only to be learned from the practice of the present invention. The objects and advantages of the present invention may be realized and obtained as particularly pointed out in the appended claims.

According to the present invention, the foregoing and other objects are achieved by a magnetic recording medium comprising: a non-magnetic substrate; an intermediate layer comprising cobalt, about 10 up about 15 atomic % chromium, and tantalum; and a magnetic layer on the intermediate layer.

Another aspect of the present invention is a method of manufacturing a magnetic recording medium, the method comprising: conveying a non-magnetic substrate to a magnetic layer deposition chamber; and sequentially depositing on the substrate in the deposition chamber: an intermediate layer comprising cobalt, about 10 up to about 15 atomic percent chromium, and tantalum; and a magnetic layer on the intermediate layer.

Additional objects and advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature, and not as restrictive.

DESCRIPTION OF THE INVENTION

Figure 1:
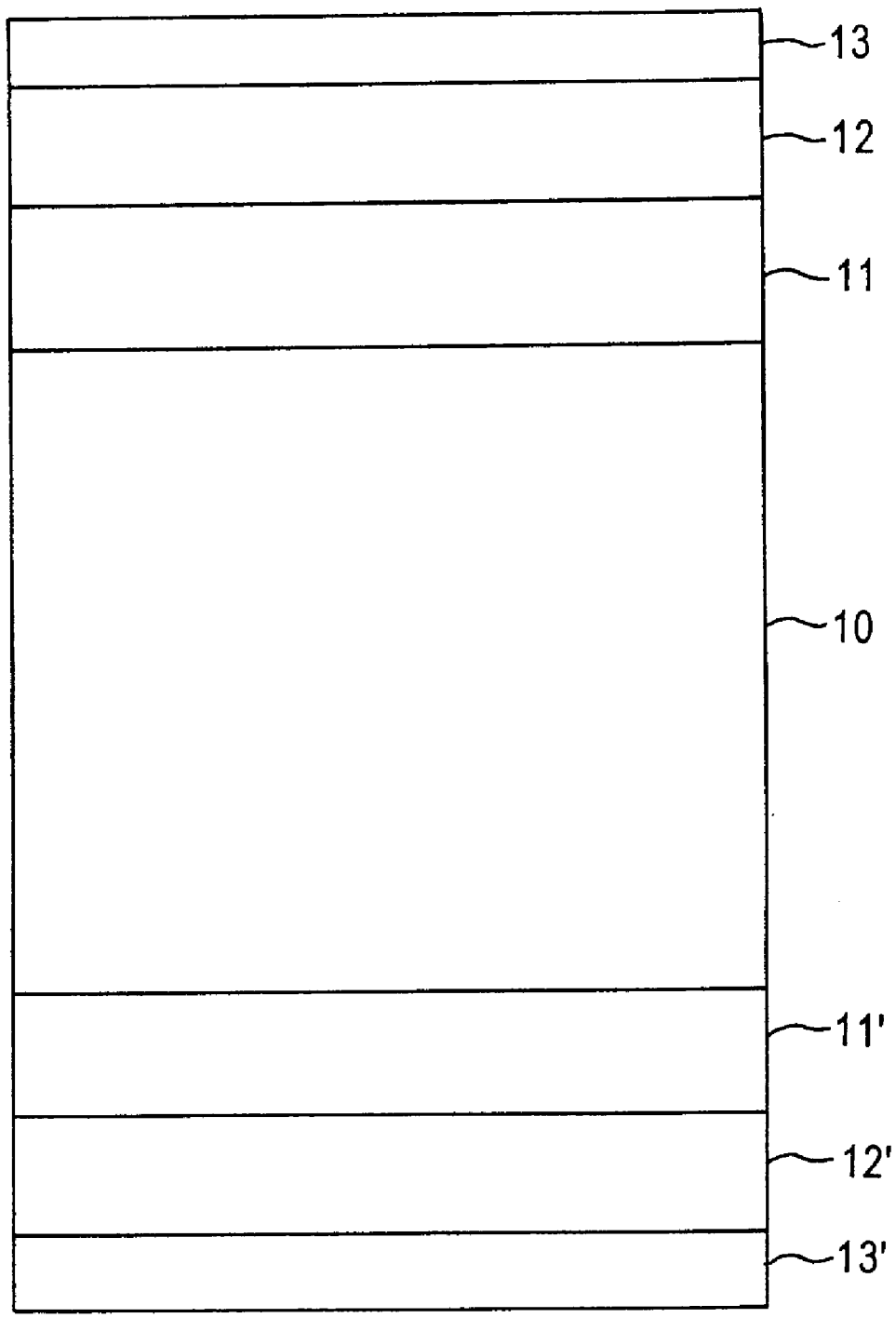
FIG. 1 schematically depicts a conventional magnetic recording medium structure.

The present invention provides magnetic recording media suitable for high areal recording density exhibiting high Hr and high S*. In accordance with embodiments of the present invention, desirably high Hr and S* are achieved by the strategic deposition of a thin magnetic Co-alloy containing chromium (Cr) and tantalum (Ta), wherein Cr is present in an amount of about 10 atomic % up to about 15 atomic %. Embodiments of the present invention comprise depositing an intermediate Co-alloy containing about 10 atomic % up to about 15 atomic % Cr and about 1 atomic % up to about 6 atomic % Ta. The CoCrTa intermediate layer can be deposited at a thickness of about 1.5 Å to about 150 Å.

After extensive experimentation and investigation it was found that deposition of a CoCrTa intermediate layer provides appropriate crystalline orientation and surface morphology for nucleation and growth of the magnetic layer thereon, thereby resulting in an increased Hr while maintaining a high S* and achieving a high SNR. The thin CoCrTa intermediate layer desirably induces a preferred (11$\bar{2}$0)-dominant crystallographic orientation in the subsequently deposited Co-alloy magnetic layer thereby resulting in decreased medium noise. The thin CoCrTa intermediate layer also enables the sputter deposition of a magnetic layer at a desirably lower temperature than conventional practices, such as less than 200° C. without sacrificing magnetic properties.

The present invention involves the use of any of various substrate materials conventionally employed in the manufacture of magnetic recording media, such as NiP-plated Al or Al-alloys, e.g., AlMg, or glass, ceramic or glass-ceramic materials. The present invention also encompasses the use of any of various magnetic alloy layers conventionally employed in the manufacture of magnetic recording media, such as Co-alloys, e.g. Co-alloys containing Cr, platinum (Pt) and Ta, as well as CoCrTa magnetic layers. In sputter depositing the magnetic layer on the intermediate layer, inclusive of CoCrTa magnetic layers, an interface is formed between the intermediate layer and the magnetic layer. The intermediate layer substrate surface provides appropriate crystalline orientation and surface morphology for nucleation and growth of the magnetic layer thereon. Advantageous results have been achieved employing $CoCr_{17}Pt_8Ta_4$ magnetic alloy layers as well as $CoCr_{15}Pt_{9.5}Ta_4$ magnetic alloy layers (the numerical designations indicating atomic percentages).

The present invention also encompasses the use of conventional adhesion layers, such as Cr or Cr-alloys, seedlayers, such as NiP, and underlayers, such as Cr and Cr-alloys, e.g., chromium-vanadium (CrV), chromium-titanium (CrTi), chromium-titanium boron (CrTiB) and chromium-tantalum oxide (Cr—$Ta_2O_5$), nickel aluminum (NiAl) and iron-aluminum (FeAl), as well as multilayered underlayers, such as CrV/Cr, CrV/NiAl/Cr, CrV/NiAl/Cr/Cr—$Ta_2O_5$.

The strategic use of an intermediate CoCrTa layer in accordance with embodiments of the present invention enables sputter deposition of subsequently applied layers at lower substrate temperatures, to achieve a desirably high Hr without sacrificing S* or SNR. Thus, sputter deposition of magnetic layers and protective overcoats can be conducted at a temperature of about 100° C. to about 200° C.

Figure 2:
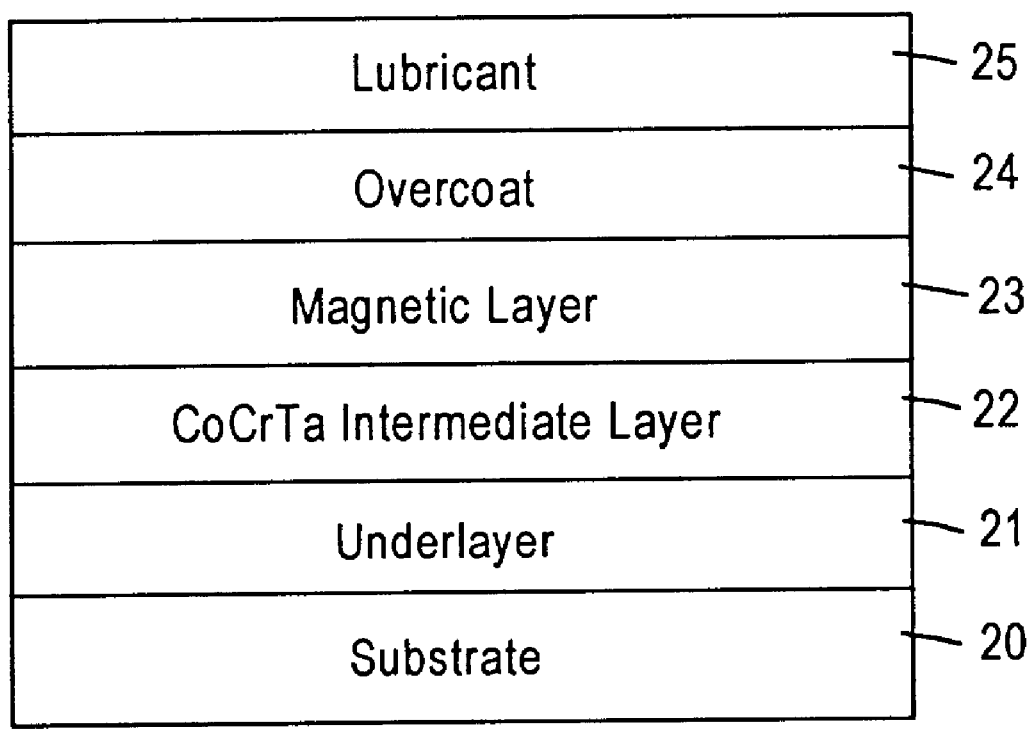
FIG. 2 schematically depicts a magnetic recording medium structure in accordance with an embodiment of the present invention.

An embodiment of the present invention is schematically illustrated in FIG. 2 and comprises substrate 20. For illustrative convenience, the sequentially deposited layers are shown only on one side of substrate 20. However, it is understood that the present invention comprises sputter depositing sequential layers on both sides of substrate 20, as in FIG. 1.

Adverting to FIG. 2, an underlayer 21, e.g. CrV, is sputter deposited on substrate 20, which can be AlMg, or a glass, ceramic or glass-ceramic material. A thin CoCrTa intermediate layer 22 is sputter deposited on underlayer 21 and a magnetic layer 23, e.g. CoCrTa or CoCrPtTa, is sputter deposited on intermediate layer 22. A carbon-containing protective overcoat 24 is sputter deposited on magnetic layer 23. A lubricant topcoat is then applied to protective overcoat 24.

Figure 3:
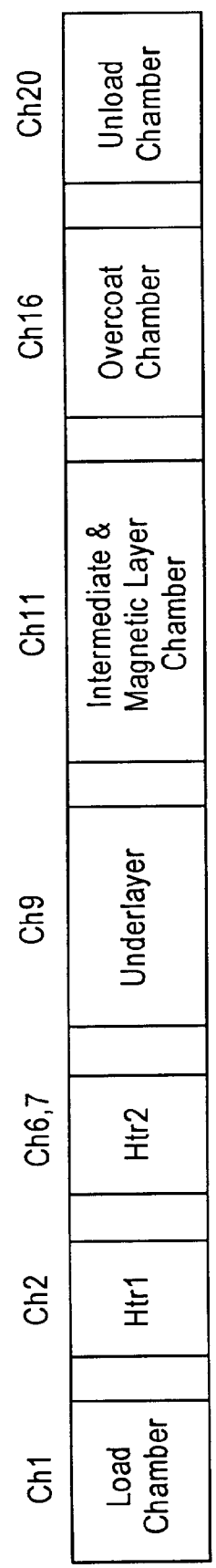
FIG. 3 schematically illustrates a sputtering system for use in the present invention.

A sputtering system which can be employed for implementing the present invention is schematically illustrated in FIG. 3. A pallet containing multiple disks is initially introduced into the load chamber and subsequently conveyed to an underlayer deposition chamber (Ch 9) wherein the underlayer is sputter deposited. The pallet is then conveyed to the magnetic layer deposition chamber (Ch 11) wherein a thin intermediate CoCrTa layer is sputter deposited on the underlayer and, immediately thereafter in the same chamber, the magnetic layer is sputter deposited on the intermediate layer. A carbon-containing protective overcoat is sputter deposited on the magnetic layer in overcoat deposition chamber (Ch 16). The numerical chamber designations are employed for convenience and do not necessarily represent the number of chambers in the system.

During conveyance of the pallet, after deposition of the underlayer to the magnetic layer deposition chamber (Ch 11), the surface of the underlayer may, and frequently will, react with residual oxygen in the system. Consequently, the surface of the underlayer will be partially oxidized. The oxidized underlayer surface, therefore, exhibits a small degree of surface roughness which was found consistent with proper magnetic layer orientation.

EXAMPLE

Figure 4:
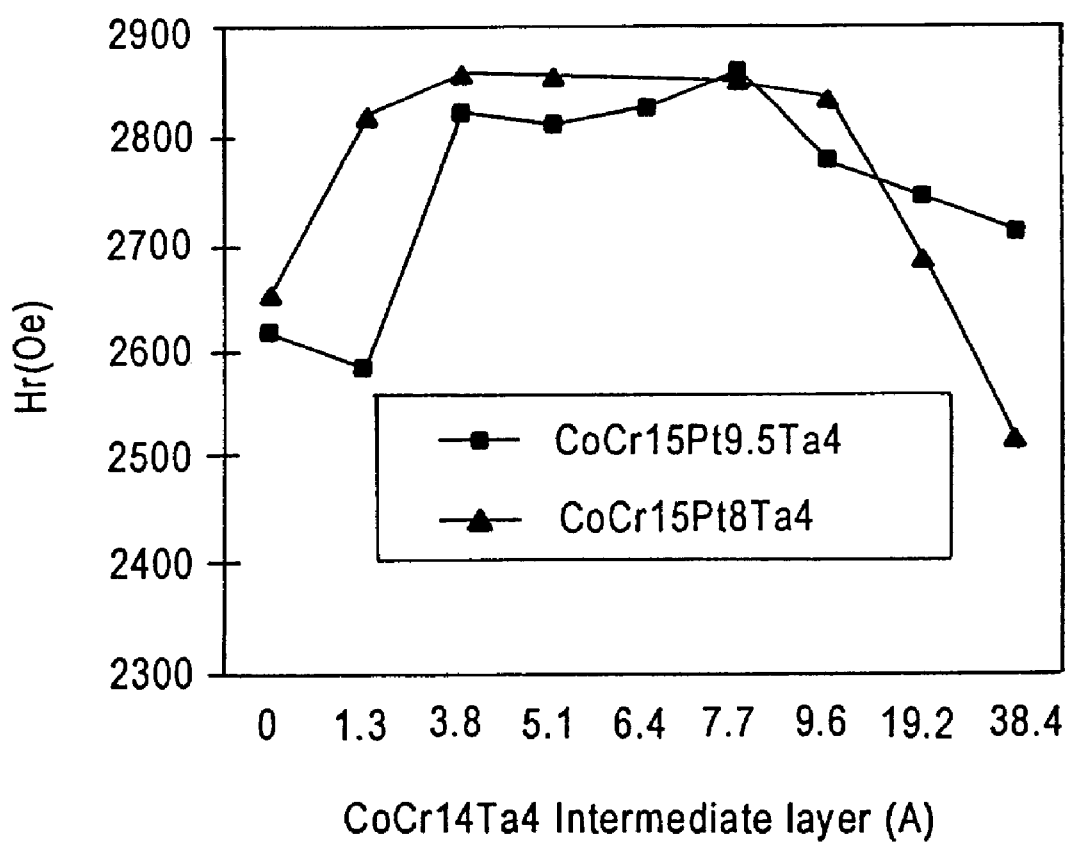
FIG. 4 illustrates the effect of intermediate layer thickness on Hr.

Magnetic recording media were prepared, each comprising a glass substrate and sequentially deposited thereon a Cr adhesion layer, NiP seedlayer, and an intermediate layer comprising Co, 14 atomic percent Cr and 4 atomic percent Ta. One group of media contained a magnetic alloy of $CoCr_{15}Pt_8Ta_4$, while the other group contained a magnetic alloy layer of $CoCr_{15}Pt_{9.5}Ta_4$. The thickness of the CoCrTa intermediate layer of each group appear in FIG. 4 and illustrate the advantageous increase in Hr achieved by a thin CoCrTa intermediate layer. In all media, employing different magnetic alloys, a thin intermediate layer of about 5 Å increased the Hr by about 200 Oe.

Figure 5:
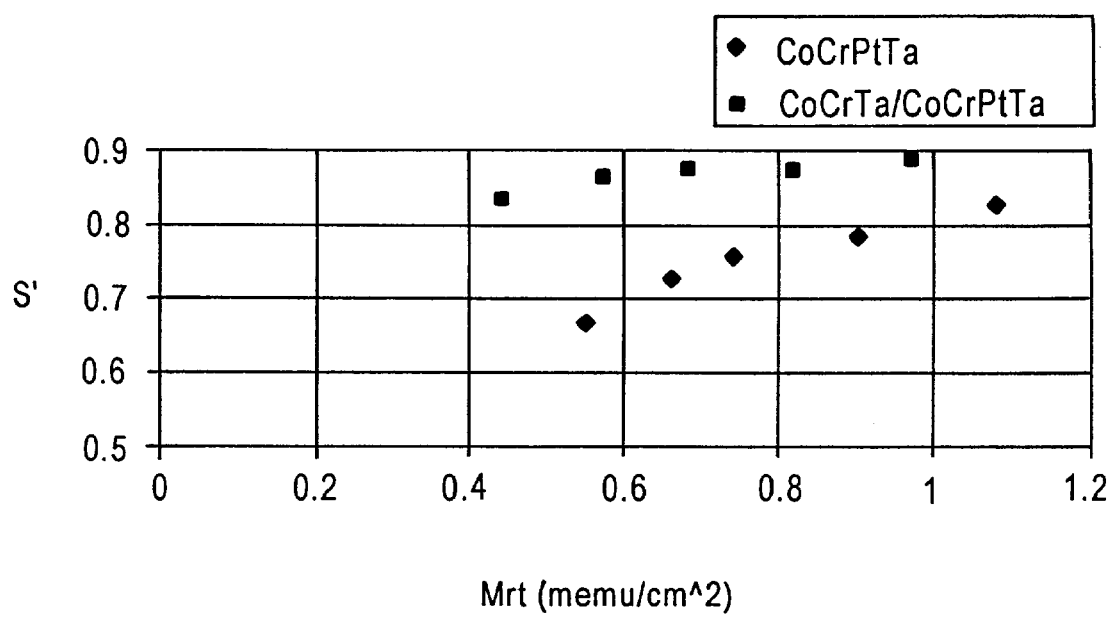
FIG. 5 illustrates the effect of the intermediate layer on S' (remanent coercivity squareness).

FIG. 5 compares remanent coercivity squareness (S') of CoCrPtTa media at different Mrt with and without the flash CoCrTa layer. The S' of the media with CoCrTa intermediate layers is much higher than that of the media without the intermediate layers. The saturation magnetization of media containing single magnetic layers of $CoCr_{15}Pt_8Ta_4$ and $CoCr_{14}Ta_4$ is respectively, 390 and 606 emu/cm$^3$, measured with a vibrating sample magnetometer and a Tencor surface profiler.

The present invention provides high areal density magnetic recording media comprising a thin CoCrTa intermediate layer for appropriate crystalline orientation and surface morphology for the nucleation and growth of a magnetic layer thereon, thereby achieving increased Hr while maintaining or improving S*. The present invention is applicable to the production of a various types of recording media, and is not limited to any particular substrate material, underlayer, magnetic layer, protective overcoat or lubricant topcoat.

Only certain embodiments of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A magnetic recording medium comprising:
    a non-magnetic substrate;
    an intermediate layer comprising cobalt, about 10 up to about 15 atomic % chromium, and tantalum; and
    a magnetic layer, having a (11$\bar{2}$0)-dominant crystallographic orientation, on the intermediate layer.

2. The magnetic recording medium according to claim 1, wherein the intermediate layer comprises about 1 to about 6 atomic % tantalum.

3. The magnetic recording medium according to claim 2, wherein the magnetic layer comprises an alloy of cobalt, chromium, platinum and tantalum.

4. The magnetic recording medium according to claim 2, further comprising a underlayer under the intermediate layer.

5. The magnetic recording medium according to claim 4, wherein the underlayer is a composite underlayer.

6. The magnetic recording medium according to claim 2, wherein the substrate comprises a nickel-phosphorous-coated aluminum or aluminum alloy, or a glass, ceramic or glass-ceramic material.

7. The magnetic recording medium according to claim 6, further comprising:
    an adhesion layer on the substrate; and
    a nickel-phosphorus seedlayer on the adhesion layer; wherein
    the substrate comprises a glass, ceramic or glass-ceramic material and the intermediate layer is on the seedlayer.

8. The magnetic recording medium according to claim 2, wherein the intermediate layer has a thickness of about 1.5 Å to about 150 Å.

9. The magnetic recording medium according to claim 2, wherein the intermediate layer comprises about 14 atomic % chromium.

10. A method of manufacturing a magnetic recording medium, the method comprising:
    conveying a non-magnetic substrate to a magnetic layer deposition chamber; and
    sequentially depositing on the substrate in the deposition chamber:
        an intermediate layer comprising cobalt, about 10 up to about 15 atomic percent chromium, and tantalum; and
        a magnetic layer having a (11$\bar{2}$0)-dominant crystallographic orientation.

11. The method according to claim 10, wherein the intermediate layer comprises about 1 to about 6 atomic % tantalum.

12. The method according to claim 11, wherein the intermediate alloy comprises about 14 atomic % chromium.

13. The method according to claim 11, wherein the magnetic layer comprises a alloy of cobalt, chromium, platinum and tantalum.

14. The method according to claim 11, further comprising depositing an underlayer on the substrate in an underlayer deposition chamber before conveying the substrate to the magnetic layer deposition chamber.

15. The method according to claim 14, comprising depositing a composite underlayer on the substrate in the underlayer deposition chamber.

16. The method according to claim 11, wherein the substrate comprises a nickel-phosphorous coated aluminum or aluminum alloy, or a glass, ceramic or glass-ceramic material.

17. The method according to claim 16, further comprising:
    depositing an adhesion layer on the substrate;
    depositing a nickel phosphorus seedlayer on the adhesion layer; and
    conveying the substrate to the magnetic layer deposition chamber.

18. The method according to claim 11, comprising depositing the intermediate layer at a thickness of about 1.5 Å to about 150 Å.

19. The method according to claim 11, comprising sputter depositing the intermediate layer and magnetic layer.

20. The magnetic recording medium according to claim 1, wherein the intermediate layer is directly on the substrate.

21. The magnetic recording medium according to claim 4, wherein a surface of the underlayer is oxidized.

22. The method according to claim 10, comprising depositing the intermediate layer directly on the substrate.

23. The method according to claim 14, comprising:
conveying the substrate from the underlayer deposition chamber to the magnetic layer deposition chamber such that a surface of the underlayer is oxidized; and
sputter depositing the intermediate layer on the oxidized surface of the underlayer.

* * * * *